United States Patent
Crowther

(10) Patent No.: US 6,767,856 B1
(45) Date of Patent: Jul. 27, 2004

(54) TRANSITION METAL OLEFIN POLYMERIZATION CATALYST HAVING CYCLOPROPENYL DERIVED LIGANDS

(75) Inventor: Donna Jean Crowther, Seabrook, TX (US)

(73) Assignee: Univation Technologies, LLC, Houston, TX (US)

(*) Notice: Subject to any disclaimer, the term of this patent is extended or adjusted under 35 U.S.C. 154(b) by 0 days.

(21) Appl. No.: 09/634,195

(22) Filed: Aug. 9, 2000

(51) Int. Cl.[7] .................. B01J 31/00; B01J 37/00; C08F 4/02; C08F 4/60; C08F 4/44

(52) U.S. Cl. .................. 502/103; 502/117; 502/152; 526/160; 526/161; 526/172; 526/943

(58) Field of Search .................. 502/103, 117, 502/152; 526/160, 161, 172, 943

(56) References Cited

U.S. PATENT DOCUMENTS

| 3,379,706 | A | | 4/1968 | Wilke | |
|---|---|---|---|---|---|
| 5,700,748 | A | * | 12/1997 | Murray | 502/103 |
| 5,777,120 | A | * | 7/1998 | Jordan et al. | 502/152 |
| 5,912,311 | A | * | 6/1999 | Murray | 502/117 |
| 6,175,026 | B1 | * | 1/2001 | Eisch et al. | 502/117 |
| 6,579,998 | B2 | * | 6/2003 | Sita et al. | 556/53 |

OTHER PUBLICATIONS

F. A. Cotton et al., "Advanced Inorganic Chemistry: a Comprehensive Text", Wiley–Interscience, 1980, p. 1161.*
J. P. Collman et al., "Principles and Applications of Organotransition Metal Chemistry", University Science, 1987, pp. 145, 171, 470–473, 488–489.*
Robert Ditchfield et al., "Synthesis and Dynamic NMR Studies of η3–Triphenyl– and η3–Trimethylcyclopropenyl Complexes of Ruthenium, [Ru(η5–C5R5)(η3C3 R'3)X2] (R =H, Me: R =Me, Ph; X = Cl, Br, I). Extended Hückel Molecular Orbital Study of Barriers to Rotation of η3–Cyclopropenyl Ligands in Isolelectonic Ruthenium and Molybdenum Complexes" Organometallics 12, 2258–2267 (1993).
R.G. Hayter, New π–Allyl Complexes of Molybdenum and Tungsten, J. Organometal. Chem., 13 (1968) P1–p3.
Karl Ofele, "Dichlor (2,3–diphenylcyclopropenyliden)palladium(II)" J. Organometal. Chem., 22(1970) C9–C11.
Russell P. Hughes et al., "A Novel Transition–Metal–Promoted Rearrangement of a Cyclopropenyl Cation. Synthesis and Crystal and Molecular Structure of a 1–3–η–Butadienyl Complex of Platinum" Organometallics 4,2055–2057 (1985).
Jian–Kun Shen et al., "Kinetics of CO Substitution in Reactions of η3–Cyclopropenyl Complexes of Iron, Cobalt, Rhodium, and Iridium with Phosphorus Ligands. First Examples of a Dissociative Mechanism for CO Substitution in the Cobalt Triad Carbonyl Complexes" J. Am. Chem. Soc.115, 11312–11318 (1993).

* cited by examiner

Primary Examiner—Mark L. Bell
Assistant Examiner—J. Pasterczyk
(74) Attorney, Agent, or Firm—Osborne K. McKinney; Kevin M. Faulkner

(57) ABSTRACT

This invention is directed to cationic polymerization of olefins using catalysts comprising a Group 6 or 10 neutral transition metal cation composition having a cyclopropenyl ring, a pi-bonded cyclopentadienyl ligand or cyclopentadienyl group-containing ligand and an amido or imido ligand. The precursor of the neutral transition metal composition is activated to a catalytic state by exposure to an activator composition that may be any of the heretofore known activator compositions such as an alumoxane or a compatible non-coordinating anion (NCA).

9 Claims, No Drawings

TRANSITION METAL OLEFIN POLYMERIZATION CATALYST HAVING CYCLOPROPENYL DERIVED LIGANDS

BACKGROUND OF THE INVENTION

1. Field of the Invention

This invention relates to catalysts, catalyst systems and to methods for their production and use in olefin polymerization.

2. Description of the Related Art

A catalyst technology has developed which provides for the modification and/or control over the properties and characteristics of a polymer. This technology principally involves the general field of transition metal catalysis. These catalysts can be referred to as bulky organo ligand transition metal catalysts. The bulky organo ligand contains a multiplicity of bonded atoms, preferably carbon atoms, forming a group which is cyclic and aromatic in nature. The bulky organo ligand may be a cyclopentadienyl ligand or cyclopentadienyl-derived ligand (collectively hereafter referred to as "Cp") which can be mono- or poly-nuclear. One or more bulky organo ligands are pi-bonded to the transition metal atom. The transition metal atom may be a Group 4, 5 or 6 transition metal. Other ligands may be bonded to the transition metal, such as a hydrocarbyl or halogen leaving group at least one of which is abstractable by a cocatalyst. The catalyst is derivable from a compound of the formula:

wherein Cp is the bulky organo ligand, X is a leaving group, M is a transition metal and "m" and "n" are such that the total ligand valency corresponds to the transition metal valency. Preferably the catalyst is four co-ordinate such that the compound is ionizable by a cocatalyst to a 1+ valency state.

The ligands Cp and X may be bridged to each other and if two ligands Cp and/or X are present, they may be bridged to each other. The compounds, known as "metallocenes," may be "full-sandwich" compounds having two Cp ligands which may be cyclopentadienyl ligands or cyclopentadienyl-derived ligands pi-bonded to the metal atom or "half-sandwich" compounds having one Cp ligand which is a cyclopentadienyl ligand or cyclopentadienyl-derived ligand.

Generally, these bulky organo ligand catalysts are referred to as metallocene catalysts. Polymerization of olefins with metallocene catalysts requires their activation, such as by an alumoxane cocatalyst. Metallocene-alumoxane catalysts have been described in EP-A-0 129 368, published Jul. 26, 1989, U.S. Pat. Nos. 4,897,455, 4,937,299, 5,017,714, 5,057,475, 5,086,025 and 5,120,867. For instance, U.S. Pat. No. 5,057,475 and related U.S. Pat. No. 5,227,440 described a supported catalyst system that includes an inert support material, a Group 4 transition metal metallocene component and an alumoxane component.

EP-A-0 277 003 and EP-A-0 277 004, published Aug. 3, 1987, PCT International Publication WO 91/09882, published Jul. 11, 1991 and WO 92/0333 describe a Group 4 transition metal metallocene catalyst system that does not require alumoxane as an activator. The activator for the metallocene component described in these references is referred to as an ionic activator or a non-coordinating anion which comprises at least one moiety capable of abstracting a ligand other than the bulky organo ligand from the compound to produce a resulting cationic bulky organo ligand compound and an anionic activator compound. The ionic activator, which comprises a cation, irreversibly reacts with a ligand of a bulky organo ligand transition metal compound to produce a bulky organo ligand transition metal cation which combines with the anion of the activator to form an ionic pair. This ionic pair is the active catalyst.

The specifics of the structure of the cyclopentadienyl derived ligand, and any hetero-atom ligand when these ligands are bridged together in the transition metal compound can impart differing properties to the polymerization process and to the polymer thereby produced.

To date it seems that the Group 4 transition metals, namely, Ti, Zr and Hf have been the most studied and used transition metals for metallocene catalyst systems, especially for bis Cp catalyst systems —$Cp_2MX_2$—. Bis Cp catalyst systems are of particular interest for their ability to exert steric control over the insertion of comomers during the copolymerization of ethylene with a comonomer such as propylene, butylene, hexene or the like. In part it is believed that the bulky organo ligands of the full sandwich $Cp_2MX_2$ compound exerts a degree of steric and/or electronic guidance upon the path by which comonomer can approach the catalytically active metal site at which the polymer forms. Where "n" is the period of the Periodic Table of the Elements of the transition metal, bis $C_p$ Group 4 transition metal compounds contain 16 electrons in the combination of the transition metal's (n-1)d, (n)s and (n)p orbitals that participate in the formation of the molecular orbitals of the compound. Each pi-bonded Cp ligand contributes 5 electrons (2×5=10) the group 4 transition metal contains 4 electrons and each to the two X ligands contribute 1 electron (2×1=2) which sums to 16. Hence the molecular orbitals of the neutral $Cp_2$Group 4 transition metal $X_2$ compound are 2 electrons shy of that of the inert gas configuration of 18 electrons and can thus serve as active catalyst when the group 4 metal is in an ionic state. However, the effectiveness of such bis Cp transition metal compounds as catalyst declines significantly as their metal is changed out for the higher Group 5 and/or 6 transition metals. For example $Cp_2$ Cr $X_2$ would not be expected to be very catalytically active since it contains 18 electrons in its (n-1)d, (n)s and (n)p orbital shells which is the inert gas configuration.

It would be desirable to develop a bulky organo ligand for the formation of a wider range of bulky organo ligand transition metal compounds that would allow higher numbered group metals than the group 4 metals to be effectively used as catalyst components for olefin polymerization.

SUMMARY OF THE INVENTION

This invention is directed to cationic polymerization of olefins using catalysts comprising a Group 3, 4, 5, 6, 8, 9 or 10, or any subset thereof, transition metal cation composition wherein at least one ligand coordinated to the transition metal is a moiety comprising a cyclopropenyl structure. The neutral transition metal compound catalyst precursor is activated to a catalyst state by exposure to an activator composition which may be any of the heretofore known activator compositions such as alumoxane or a compatible non-coordinating anion (NCA). Hereafter a catalyst composed of such transition metal cation will be referred to as a "cyclopropenyl transition metal catalyst"

Preferred cyclopropenyl transition metal derivatives include transition metals that are a mono- or bis- cyclopropenyl derivative of a transition metal. Preferred cyclopropenyl transition metal derivatives include transition metals that in their neutral state contain 16, 14, 12 and/or 10 electrons in the molecular orbitals derived from the (n-1)d, (n)s and (n)p orbitals of the transition-metal. After the cyclopropenyl ligand the remaining ligand structures of the transition metal composition can be like that of any mono- or bis- cyclopentadienyl (Cp) derivative of a Group 4, 5 or 6 transition metal here before known in the art to form an active metallocene catalyst system upon exposure to an activator composition.

With the cyclopropenyl transition metal compounds of this invention one may use a wider range of transition metals to form active catalyst systems that are activated by alumoxanes and/or non-coordinating anions.

DETAILED DESCRIPTION OF INVENTION

Olefin polymerization catalyst of this invention are those compositions that result from the exposure of a neutral transition metal compound (Tm) to an activator composition (AC), wherein the transition metal compound is composed of a transition metal (M) of a coordination number of "v" satisfied by ligands at least one of which is a cyclopropenyl or cyclopropenyl-derived moiety. The activator composition may be any composition known in the art to activate a metallocene to an active catalytic state, such as alumoxanes and/or ionic compounds that react with a metallocene so as to provide a non-coordinating anion moiety to the catalytic complex.

The Transition Metal Component of the Catalyst

The transition metal compound for the catalyst may be represented by the following formulas:

$$(C_3R_3)_mMX_n$$

wherein $(C_3R_3)$ is a cyclopropenyl ring and each R is a monodentate or a bidentate radical and is independently hydrogen, hydrocarbyl, substituted-hydrocarbyl, halocarbyl, substituted-halocarbyl, hydrocarbyl-substituted organometalloid, halocarbyl-substituted organometalloid, disubstituted boron, disubstituted pnictogen, substituted chalcogen or halogen, and when R is a bidentate radical it may form a $C_4$ to $C_{20}$ ring system to give a saturated or unsaturated polycyclic cyclopropenyl ligand or it may form a bridge between one (C3R3) and another (C3R3) or an X radical; each X radical is independently a halide, hydride, hydrocarbyl, substituted hydrocarbyl, halocarbyl, substituted halocarbyl, and hydrocarbyl- and halocarbyl-substituted organometalloid, substituted pnictogen, or substituted chalcogen and one X may be a pi-bonded cyclopentadienyl or a cyclopentadienyl-derived ligand and one X may be an amido or an imido radical; M is a Group 3, 4, 5, 6, 8, 9 or 10, or any subset thereof, transition metal, and m and n are integers of 1 or greater and m+n satisfies the valence of M. The cyclopropenyl substituents R themselves may be substituted with one or more groups and may be bridged to each other, or may be bridged through a heteroatom to the transition metal. The size and constituency of the cyclopropenyl substituents R and bridging elements are not critical to the preparation of the catalyst systems of the invention but should normally be selected in the literature described manner to enhance the polymerization activity and polymer characteristics being sought. Preferably a substituted cyclopropenyl will be hydrocarbyl-substituted and will comprise alkyl, cycloalkyl, aryl, alkylaryl and or arylalkyl substituents. Such substituents should each have essentially hydrocarbyl characteristics and will typically contain up to 30 carbon atoms but may be hetero-atom containing with not more than 1–3 non-hydrogen/carbon atoms, e.g., N, S, O, P, and Si.

In illustration of, but without limitation on the above given formula, the X ligand may each independently be chloride, bromide, hydride, methyl, ethyl, phenyl, n-propyl, isopropyl, n-butyl, amyl, isoamyl, hexyl octyl, nonyl, decyl, phenyl, cetyl, methylidene, ethylidene, propylidene and the like.

In illustration of, but without limitation on the above given formula, when one X is a cyclopentadienyl ligand it may be any one of cyclopentadienyl, 1,2-diethylcyclopentadienyl, ethylcyclopentadienyl, n-butylcyclopentadienyl, 2-cyclohexy-4-methylcyclopentadienyl, n-octylcyclopentadienyl, beta-phenylpropylcyclopentadienyl, indenyl, tetrahydroindenyl, propylcyclopentadienyl, t-butylcyclopentadienyl, benzylcyclopentadienyl, 2,4-diphenyl-3-methylcyclopentadienyl, phenylamido trimethylstannycyclopentadienyl, trimethylplumbylcyclopentadienyl, methylamido triethylplumbylcyclopentadienyl, trifluromethylcyclopentadienyl, trimethylsilcyclopentadienyl, fluorenyl, octahydrofluorenyl, N,N-dimethylamidocyclopentadienyl, dimethylphosphidocyclopentadienyl, methoxycyclopentadienyl, (N,N-dimethylamidomethyl) cyclopentadienyl, 2-cyclohexy-3-methylcyclopentadienyl, indenyl, tetrahydroindenyl, fluorenyl.

In illustration of, but without limitation on the above given formula, the cyclopropenyl ligand may be cyclopropenyl, trimethyl clcyopropenyl, triethyl cyclopropenyl, tri phenyl cyclopropenyl, dimethyl t-buthyl cyclopropenyl, dimethyl cyclopropenyl, diethyl cyclopenyl, di phenyl cyclopropenyl, methyl cyclopropenyl, ethyl cyclopenyl, phenyl cyclopropenyl, or the like.

Half Sandwich Cyclopropenyl Compounds

Half sandwich cyclopropenyl transition metal compounds of the formula:

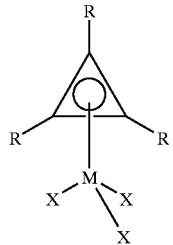

may be prepared by reacting a transition metal tetracarbonyl $(M(CO)_4)$ with a cyclopropenyl halide $((C_3R_3)X)$ in a one to one molar ratio to yield a cyclopropenyl transition metal dicarbonyl halide $((C_3R_3)M(CO)_2X)$ that may be purified by column chromatography (120 to 240 mesh $SiO_2$) with 50/50 hexane/$CH_2Cl_2$ as the eluant. The carbonyl ligands of this compound may be exchanged for halide by reaction of this compound with a phosphorus pentahalide to yield a cyclopropenyl transition metal trihalide $((C_3R_3)MX_3)$. If desired the halide ligands may be exchanged out for hydride radical, hydrocarbyl radical, substituted hydrocarbyl radical, halocarbyl radical, substituted halocarbyl radical, and hydrocarbyl- and halocarbyl-substituted organometalloid radical, substituted pnictogen radical, or substituted chalcogen radicals by any of the techniques known in the art to be applicable to the exchange out of halide ligands in a mono and bis cyclopentadienyl transition metal compound system.

Full Sandwich Cyclopropenyl Compounds

Full sandwich dicyclopropenyl transition metal compounds of the formula:

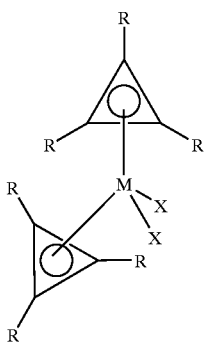

may be prepared by reacting a transition metal tetracarbonyl $(M(CO)_4)$ with a cyclopropenyl halide $((C_3R_3)X)$ in a one to two molar ratio to yield a dicyclopropenyl transition metal carbonyl halide $((C_3R_3)_2M(CO)X)$ that may be purified by column chromatography (120 to 240 mesh $SiO_2$) with 50/50 hexane/$CH_2Cl_2$ as the eluant. The carbonyl ligand of this compound may be exchanged for halide by reaction of this compound with a phosphorus pentahalide to yield a dicyclopropenyl transition metal dihalide $((C_3R_3)_2MX_2)$. If desired the halide ligands may be exchanged out for halide, hydride radical, hydrocarbyl radical, substituted hydrocarbyl radical, halocarbyl radical, substituted halocarbyl radical, and hydrocarbyl- and halocarbyl-substituted organometalloid radical, substituted pnictogen radical, or substituted chalcogen radicals by any of the techniques known in the art to be applicable to the exchange out of halide ligands in a mono and bis cyclopentadienyl transition metal compound system.

Full sandwich cyclopropenyl transition metal compounds in the form of cyclopropentyl-cyclopentadieneyl transition metal compounds of the formula:

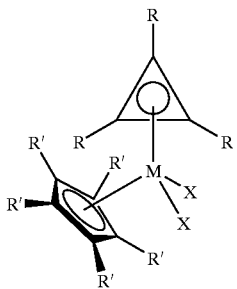

may be prepared by reacting a metal hexacarbonyl $(M(CO)_6)$ with an alkyl nitrile $(R''CN)$ to form a metal tricarbonyl trialkyl nitrile intermediate $(M(CO)_3(R''CN)_3)$ which thereafter is reacted with a cyclopropenyl halide $(C_3R_3)X$ to give a metal halide dicarbonyl dialkyl nitrile cyclopropenyl $(MX(CO)_2(R''CN)_2(C_3R_3))$ compound that may be recovered as a solid from the excess of alkyl nitrile by filtration. This solid product may then be slurried in tetrahydrofuran (THF) and then reacted with cyclopentadienyl thallium (CpTl) to produce a cyclopropenyl cyclopentadieneyl metal dicarbonyl $((Cp)(C_3R_3)M(CO)_2)$ that may be purified by column chromatography (120 to 240 mesh $SiO_2$) with 50/50 hexane/$CH_2Cl_2$ as the eluant. The carbonyl ligands of this compound may be exchanged for halide by reaction of this compound with a phosphorus pentahalide to yield a cyclopropenyl cyclopentadiene metal dihalide $((Cp)(C_3R_3)MX_2)$. The over all sequence for the synthesis is as follows:

1. $M(CO)_6 + R''CN \rightarrow M(CO)_3(R''CN)_3$
2. $M(CO)_3(R''CN)_3 + (C_3R_3)X \rightarrow MX(CO)_2(R''CN)_2(C_3R_3)$
3. $MX(CO)_2(R''CN)_2(C_3R_3) + CpTl \rightarrow (Cp)(C_3R_3)M(CO)_2$
4. $(Cp)(C_3R_3)M(CO)_2 + PX_5 \rightarrow (Cp)(C_3R_3)MX_2$ In step 1 an excess of the alkyl nitrile is employed as solvent and the metal hexacarbonyl is refluxed in the alkyl nitrile solvent for from one to twelve hours. After reflux is terminated and the solvent returned to room temperature a cyclopropenyl halide is added to the solvent and allowed to react until a solid product is formed which is then filtered away from the alkyl nitrile and the recovered solid is slurried in THF after which a cyclopentadienyl thallium compound is added to the THF slurry and allowed to react. The solid reaction product is filtered from the THF solvent and slurried in $CH_2Cl_2$ as a solvent, after which a phosphorus pentahalide is added and allowed to react, thereafter the cyclopropenyl cyclopentadieneyl metal dihalide is recovered. If desired the halide ligands may be exchanged out for hydride radical, hydrocarbyl radical, substituted hydrocarbyl radical, halocarbyl radical, substituted halocarbyl radical, and hydrocarbyl- and halocarbyl-substituted organometalloid radical, substituted pnictogen radical, or substituted chalcogen radicals by any of the techniques known in the art to be applicable to the exchange out of halide ligands in a mono and bis cyclopentadienyl transition metal compound system.

In illustration of, but without limitation on the above given formula, preferred transition metal compounds are cyclopropenyl cyclopentadienyl molybdenum dichloride, cyclopropenyl cyclopentadienyl chromium dichloride, cyclopropenyl cyclopentadienyl titanium dichloride, cyclopropenyl cyclopentadienyl zirconium dichloride, cyclopropenyl cyclopentadienyl hafnium dichloride, cyclopropenyl cyclopentadienyl scandium chloride, dicyclopropenyl iron dichloride, cyclopropenyl dialkylamido titanium dichloride, cyclopropenyl alkylimido vanadium dichloride, and cyclopropenyl palladium trichloride. In these preferred types of transition metal compounds the cyclopropenyl ring(s) and/or the cyclopentadienyl ring may be substituted with hydrocarbyl radicals that comprise alkyl, cycloalkyl, aryl, alkylaryl and or arylalkyl substituents. Such substituents (R and R') should each have essentially hydrocarbyl characteristics and will typically contain up to 30 carbon atoms but may be hetero-atom containing with not more than 1–3 non-hydrogen/carbon atoms, e.g., N, S, O, P, and Si. Triphenylcyclopropenyl is a preferred ligand for the catalyst of this invention.

Activators for the Catalyst

Catalyst systems of this invention generally comprise two components: a reactive cation and an activator composition which may be an alumoxane or a compatible non-coordinating anion. For the purposes of this patent specification, the terms "cocatalysts" and "activators" are used interchangeably and are defined to be any compound or component which can activate transition metal compound or a metallocene, as defined above.

Alumoxane Activators

It is within the scope of this invention to use alumoxane as an activator. There are a variety of methods for preparing alumoxane, non-limiting examples of which are described in U.S. Pat. Nos. 4,665,208; 4,952,540; 5,091,352; 5,206,199; 5,204,419; 4,874,734; 4,924,018; 4,908,463; 4,968,827; 5,308,815; 5,329,032; 5,248,801; 5,235,081; 5,157,137; 5,103,031 and EP-A-0 561 476, EP-B1-0 279 586; EP-A-0 594-218 and WO 94/10180, all of which are fully incorporated herein by reference. It may be preferable to use a visually clear methylalumoxane. A cloudy or gelled alumoxane can be filtered to produce a clear solution or clear alumoxane can be decanted from the cloudy solution. The alumoxane can be represented by the following formula: (R—Al—O)$_n$ which is a cyclic compound and R(R—Al—O)$_n$AlR$_2$ which is a linear compound and mixtures thereof including multi-dimensional structures. In the general formula R is a C$_1$ to C$_9$ alkyl group such as for example methyl, ethyl, propyl, butyl, pentyl, hexyl, octyl, nonyl and n is an integer from about 1 to 20. The most preferred alumoxanes are methyl alumoxane and/or ethylalumoxane. It is known in the art to make alumoxanes, see for example U.S. Pat. Nos. 4,530,914 and 4,952,716 incorporated herein by reference.

Non-Coordinating Anions as Activators

Activation of the cyclopropenyl cyclopentadieneyl transition metal compound to a catalytic state may be achieved with ionizing compounds which contain an active proton, or some other cation associated with but not coordinated to or only loosely coordinated to the remaining ion of the ionizing compound. Such compounds and the like are described in European publications EP-A-0 570 982, EP-A-0 520 732, EP-A-0 495 375, EP-A-500 944, EP-A-0 277 003 and EP-A-0 277 004, and U.S. Pat. Nos. 5,153,157, 5,198,401, 5,066,741, 5,206,197, 5,241,025, 5,384,299 and 5,502,124 and U.S. patent application Ser. No. 08/285,380, filed Aug. 3, 1994, all of which are herein fully incorporated by reference.

A preferred class of compatible non-coordinating anions (NCA) includes chemically stable, non-nucleophilic substituted anionic complexes having a molecular diameter of about 4 Angstroms or more.

Any metal or metalloid compound capable of forming an anionic complex which is resistant to irreversibly transferring a substituent or fragment to the cation to neutralize the cation to produce a neutral molecule may be used as the NCA. In addition any metal or metalloid capable of forming a-coordination complex which is stable in water may also be used or contained in a composition comprising the anion. Suitable metals include, but are not limited to aluminum, gold, platinum and the like. Suitable metalloids include, but are not limited to, boron, phosphorus, silicon and the like. Compounds containing anions which comprise coordination complexes containing a single metal or metalloid atom are, of course, well known and many, particularly such compounds containing a single boron atom in the anion portion, are available commercially. In light of this, salts containing anions comprising a coordination complex containing a single boron atom are preferred.

In general, preferred NCAs may be represented by the following general formula:

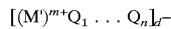

wherein: M' is a metal or metalloid; Q$_1$ to Q$_n$ are, independently, bridged or unbridged hydride radicals, dialkylamido radicals, alkoxide and aryloxide radicals, hydrocarbyl and substituted-hydrocarbyl radicals, halocarbyl and substituted-halocarbyl radicals and hydrocarbyl and halocarbyl-substituted organometalloid radicals and any one, but not more than one of Q$_1$ to Q$_n$ may be a halide radical; m is an integer representing the formal valence charge of M'; n is the total number of ligands Q, and d is an integer greater than or equal to 1.

It is of course understood that the anions described above and below may be counter balanced with a positively charged component that is removed before the anion acts with the cation.

In a preferred embodiment M' is boron, n=4, Q$_1$ and Q$_2$ are the same or different aromatic or substituted-aromatic hydrocarbon radicals containing from about 6 to about 20 carbon atoms and may be linked to each other through a stable bridging group; and Q$_3$ and Q$_4$ are, independently, hydride radicals, hydrocarbyl and substituted-hydrocarbyl radicals, halocarbyl and substituted-halocarbyl radicals, hydrocarbyl- and halocarbyl-substituted organometalloid radicals, disubstituted pnictogen radicals, substituted chalcogen radicals and halide radicals, with the proviso that Q$_3$ and Q$_4$ will not be halide at the same time.

Illustrative, but not limiting, examples of boron components which may be used as NCAs are: tetra-valent boron compounds such as tetra(phenyl)boron, tetra(p-tolyl)boron, tetra(o-tolyl)boron, tetra(pentafluorophenyl)boron, tetra(o, p-dimethylphenyl)boron, tetra(m,m-dimethylphenyl)boron, (p-tri-fluoromethylphenyl)boron and the like.

In a particularly preferred embodiment M=boron, n=4, Q$_1$, Q$_2$ and Q$_3$ are each (C$_6$F$_5$) and Q$_4$ is as defined above. Illustrative but not limiting, examples of these preferred NCAs comprising boron triphenylmethyl salts where Q is a simple hydrocarbyl such as methyl, butyl, cyclohexyl, or phenyl or where Q is a polymeric hydrocarbyl of indefinite chain length such as polystyrene, polyisoprene, or polyparamethylstyrene.

Another preferred class of NCAs is that class comprising those NCA containing a plurality of boron atoms, including boranes and carboranes.

Illustrative, but not limiting, examples of NCAs include carboranes such as dodecaborate, decachlorodecaborate, dodecachlorododecaborate, 1-carbadecaborate, 1-carbadecaborate, 1-trimethylsilyl-1-carbadecaborate; borane and carborane complexes and salts of borane and carborane anions such as decaborane(14), 7,8-dicarbadecaborane(13), 2,7-dicarbaundecaborane(13), undecahydrido-7,8-dimethyl-7,8-dicarbaundecaborane, 6-carbadecaborate(12), 7-carbaundecaborate, 7,8-dicarbaudecaborate; and metallaborane anions such as bis(nonahydrido-1,3-dicarbanonaborato)cobaltate(III), bis(undecahydrido-7,8-dicarbaundecaborato) ferrate(III), bis(undecahydrido-7,8-dicarbaundecaborato) cobaltate(III), bis(undecahydrido-7,8-dicarbaunaborato) nikelate(III), bis(nonahydrido-7,8-dimethyl-7,8-dicarbaundecaborato) ferrate(III), bis(tribromooctahydrido-7,8-dicarbaundecaborato)cobaltate(III), bis(undecahydridodicarbadodecaborato) cobaltate(III) and bis(undecahydrido-7-carbaundecaborato) cobaltate(III).

The NCA compositions most preferred for forming the catalyst system used in this process are those containing a tris-perfluorophenyl boron, tetrapentafluorphenyl boron anion and/or two or more tripentafluorophenyl boron anion groups covalently bond to a central atomic molecular or polymeric complex or particle.

The anion may be combined with the cation by any method known to those of ordinary skill in the art. For example, a composition containing the NCA fragment is first treated to produce the anion in the presence of the reactive cation or reactive cation source, i.e. the anion is activated. Likewise the NCA may be activated without the presence of the reactive cation or cation source which is subsequently introduced. In a preferred embodiment a composition containing the anion and a composition containing the reactive cation are combined and allowed to react to form a by product, the anion and the cation. In another preferred embodiment the NCA is introduced into the solvent as a compound containing both the anion and the cation in the form of the active catalyst system.

The cyclopropenyl transition metal cations ($C_3R'_3 Tm^+$) can be combined into an active catalyst in at least two ways. A first method is to combine a compound comprising the $C_3R'_3 Tm^+$ with a second compound comprising the NCA which then react to form a by product and the active "non-coordinating" pair. Likewise, the $C_3R'_3 Tm^+$ compound may also be directly combined with the NCA to form the active catalyst system. Typically the NCA is combined with the cation/cation source in ratios of 1 to 1, however ratios of 1 to 100 ($C_3R'_3 Tm^+$ to NCA) also work in the practice of this invention.

Active cationic catalysts can be prepared by reacting a transition metal compound with some neutral Lewis acids, such as $B(C_6 F_5)_{3n}$, which upon reaction with a hydrolyzable ligand (X) of the transition metal compound forms an anion, such as $([B(C_6 F_5)_3 (X)]^-)$, which stabilizes the cationic transition metal species generated by the reaction.

Supported Forms of the Catalyst

For purposes of this patent specification the terms "carrier" or "support" are interchangeable and can be any support material, preferably a porous support material, such as for example, talc, inorganic oxides, inorganic chlorides, for example magnesium chloride and resinous support materials such as polystyrene polyolefin or polymeric compounds or any other organic support material and the like that has an average particle size greater than 10 .mu.m.

The preferred support materials are inorganic oxide materials, which include those from the Periodic Table of Elements of Groups 2, 3, 4, 5, 13 or 14 metal oxides. In a preferred embodiment, the catalyst support materials include silica, alumnina, silica-alumina, and mixtures thereof. Other inorganic oxides that may be employed either alone or in combination with the silica, alumina or silica-alumina are magnesia, titania, zirconia, and the like.

It is preferred that the carrier of the catalyst of this invention has a surface area in the range of from about 10 to about 700 $m^2/g$, pore volume in the range of from about 0.1 to about 4.0 cc/g and average particle size in the range of from about 10 to about 500 $\mu$m More preferably, the surface area is in the range of from about 50 to about 500 $m^2/g$, pore volume of from about 0.5 to about 3.5 cc/g and average particle size of from about 20 to about 200 $\mu$m. Most preferably the surface area range is from about 100 to about 400 $m^2/g$, pore volume from about 0.8 to about 3.0 cc/g and average particle site is from about 30 to about 100 $\mu$m. The pore size of the carrier of the invention typically has pore size in the range of from 10 to 1000 Å, preferably 50 to about 500 Å, and most preferably 75 to about 350 Å.

The supported catalyst system of the invention can be made in a variety of different ways.

For the purposes of this patent specification and appended claims the term "solution" includes a suspension, a slurry or a mixture. Any compatible solvent or other liquid capable of forming a solution or the like with at least one cyclopropenyl transition metal catalyst component and/or at least one activator of the invention can be used. Non-limiting examples of solvents are those aliphatic, aromatic and saturated hydrocarbons and cyclic hydrocarbons, such as isopentane, heptane, toluene and the like. The more preferred solvents are the cyclic aliphatic and aromatic hydrocarbons, the most preferred of which is toluene.

In one embodiment, the cyclopropenyl transition metal catalyst component is typically slurried in a solvent to form a cyclopropenyl transition metal solution and a separate solution is formed containing an activator and a solvent. The cyclopropenyl transition metal solution and the activator solution are then added to a porous support, or vice-versa, or any combination thereof.

In another embodiment, the cyclopropenyl transition metal solution is added to the porous support first before the addition of the activator solution. In yet another embodiment, the activator solution is added first to the porous support, or vice versa, before the addition of the cyclopropenyl transition metal solution. In still yet another embodiment, part or all of the cyclopropenyl transition metal solution can be added to the porous support material, or vice-versa, followed by the addition of all or part of the activator solution. If parts are used the remaining portions of each solution can be added in any order to the porous support.

It is preferable to apply the solution containing catalyst component(s) to the support such that a homogeneous catalyst system is obtained, i.e., wherein the component(s) are evenly distributed on and within the support material particles. In a preferred embodiment, the total volume of solution containing cyclopropenyl transition metal compound and activator added to the support is in the range of from less than that volume at which a slurry is formed to above that volume equal to the total pore volume of the support, preferably from 2.5 times the total pore volume of the support to about 1.05 times the total pore volume of the support, more preferably from about 2.4 to about 1.1 times the total pore volume of the support, even more preferably from about 2.3 to about 1.2 times the total pore volume of the suppport, even more preferably from about 2.2 to about 1.25 times the total pore volume of the support, even more preferably from about 2.1 to about 1.27 times the total pore volume of the support, even more preferably from about 2.0 to about 1.3 times the total pore volume of the support, and even more preferably from about 2.0 to about 1.5 times the total pore volume of the support. Preferably, the solution is applied either dropwise or as a spray while the support is agitated or otherwise thoroughly mixed.

Generally, a slurry is formed when two phases are observable one of which contains all or most of the support material. The volume of solution required to reach this stage will vary depending upon among other things the type of support material and type of catalyst system components. Just prior to the point at which a slurry is formed, is a stage which is defined herein as the "mud" stage. At the mud stage, the solution volume is such that, while two phases are not visible, the support material is saturated and the support particles are firmly packed together. Prior to the mud stage, the volume of solution is such that the support material appearance ranges from dry and free flowing (even though the support may contain close to one pore volume of solution) to dry but slightly sticky to variously damp and clumpy such as is the appearance of variously wet sand.

In one embodiment, the volume of solution applied to the support material ranges from above one pore volume to that required to form a slurry, preferably from above one pore volume to that required to reach the mud stage. It should be recognized that catalyst systems formed in the mud stage are more difficult to mix and require longer drying times as compared to those prepared with less solution. Below one pore volume it may be difficult to obtain homogeneous coverage of the support material with the catalyst system components. This may lead to fouling.

In the most preferred embodiment, the cyclopropenyl transition metal compound and the activator are combined to form a solution which is then added to a porous support.

The catalyst systems of the invention can be used in slurry form dried to a free-flowing powder. As a free flowing powder the catalyst system of the invention can still contain an amount of solvent, for example, toluene, in the support's pores, however, it is preferred that substantially all the solvent is removed. For purposes of this specification and appended claims the term "substantially all the solvent is removed" means that greater than about 90% of all the solvent is removed from the supported catalyst system when drying.

In another embodiment, the dried supported catalyst system is washed or otherwise treated to remove weakly associated catalyst component(s). Any hydrocarbon may be used to wash the catalyst system, however, the hydrocarbon should be capable of dissolving the catalyst component and should be easy to dry from the support. Toluene and hexane are preferred.

It is within the scope of the invention to separately support at least one cyclopropenyl transition metal compound on one porous support and support at least one activator on another porous support wherein the total volume of the cyclopropenyl transition metal compound solution on the first porous support and the total volume of activator solution is as described above.

The procedure for measuring the total pore volume of a porous support is well known in the art. Details of one of these procedures is discussed in Volume 1, *Experimental Methods in Catalytic Research* (Academic Press, 1968) (specifically see pages 67–96). This preferred procedure involves the use of a classical BET apparatus for nitrogen absorption. Another method well know in the art is described in Innes, Total porosity and Particle Density of Fluid Catalysts By Liquid Titration, Vol. 28, No. 3, Analytical Chemistry 332–334 (Mar., 1956).

In another embodiment of the invention, the mole ratio of the metal of an alumoxane activator component to the transition metal of the cyclopropenyl transition metal component is in the range of ratios between 0.3:1 to 1000:1, preferably 20:1 to 800:1, and most preferably 50:1 to 500:1.

In another embodiment where the activator is an ionizing activator as previously described the mole ratio of the metal of the activator component to the transition metal component is in the range of ratios between 0.3:1 to 3:1.

The supported catalyst system of the invention may include a surface modifier such as that described in U.S. patent application Ser. No. 08/322,675 now abandoned (fully incorporated herein by reference) and/or an antistatic agent, for example, those described in U.S. Pat. No. 5,283,278, fully incorporated herein by reference. Non-limiting examples of antistatic agents include alcohol, thiol, silanol, diol, ester, ketone, aldehyde, acid, amine, and ether compounds. Tertiary amine compounds are preferred. The antistatic agent can be added at any stage in the formation of the supported catalyst system of the invention, however, it is preferred that it is added after the supported catalyst system of the invention is formed, in either a slurry or dried state.

Polymerization with the Catalyst

In one embodiment of the invention, olefin(s), preferably $C_2$ to $C_{30}$ olefin(s) or alpha-olefin(s), preferably ethylene or propylene or combinations thereof are prepolymerized in the presence of the cyclopropenyl-cyclopentadienyl Group 6 metal catalyst system of the invention prior to the main polymerization. The prepolymerization can be carried out batchwise or continuously in gas, solution or slurry phase including at elevated pressures. The prepolymerization can take place with any olefin monomer or combination and/or in the presence of any molecular weight controlling agent such as hydrogen. For examples of prepolymerization procedures, see U.S. Pat. Nos. 4,748,221, 4,789,359, 4,923,833, 4,921,825, 5,283,278 and 5,705,578 and European publication EP-B-0279 863 and PCT Publication WO 97/44371 all of which are herein fully incorporated by reference.

In one embodiment the polymerization catalyst is used in an unsupported form, preferably in a liquid form such as described in U.S. Pat. Nos. 5,317,036 and 5,693,727 and European publication EP-A-0 593 083, all of which are herein incorporated by reference. The polymerization catalyst in liquid form can be fed to a reactor as described in PCT publication WO 97/46599, which is fully incorporated herein by reference.

In one embodiment, the cyclopropenyl-cyclopentadienyl Group 6 metal catalysts of the invention can be combined with a carboxylic acid salt of a metal ester, for example aluminum carboxylates such as aluminum mono, di- and tri-stearates, aluminum octoates, oleates and cyclohexylbutyrates, as described in U.S. application Ser. No. 09/113,216, filed Jul. 10, 1998.

The catalysts and catalyst systems of the invention described above are suitable for use in any polymerization process over a wide range of temperatures and pressures. The temperatures may be in the range of from –60° C. to about 280° C., preferably from 50° C. to about 200° C., and the pressures employed may be in the range from 1 atmosphere to about 500 atmospheres or higher.

Polymerization processes include solution, gas phase, slurry phase and a high pressure process or a combination thereof Particularly preferred is a gas phase or slurry phase polymerization of one or more olefins at least one of which is ethylene or propylene.

In one embodiment, the process of this invention is directed toward a solution, high pressure, slurry or gas phase polymerization process of one or more olefin monomers having from 2 to 30 carbon atoms, preferably 2 to 2 carbon atoms, and more preferably 2 to 8 carbon atoms. The invention is particularly well suited to the polymerization of two or more olefin monomers of ethylene, propylene, butene-1, pentene-1, 4-methyl-pentene-1, hexene-1, octene-1 and decene-1.

Other monomers useful in the process of the invention include ethylenically unsaturated monomers, diolefins having 4 to 18 carbon atoms, conjugated or nonconjugated dienes, polyenes, and vinyl monomers. Non-limiting monomers useful in the invention may include norbornene, norbornadiene, isobutylene, isoprene, vinylbenzocyclobutane, styrenes, alkyl substituted styrene, ethylidene norbornene, dicyclopentadiene and cyclopentene.

In the most preferred embodiment of the process of the invention, a copolymer of ethylene is produced, where with ethylene, a comonomer having at least one alpha-olefin having from 4 to 15 carbon atoms, preferably from 4 to 12 carbon atoms, and most preferably from 4 to 8 carbon atoms, is polymerized in a gas phase process.

In another embodiment of the process of the invention, ethylene or propylene is polymerized with at least two different comonomers, optionally one of which may be a diene, to form a terpolymer.

In one embodiment, the invention is directed to a polymerization process, particularly a gas phase or slurry phase process, for polymerizing propylene alone or with one or more other monomers including ethylene, and/or other olefins having from 4 to 12 carbon atoms. Polypropylene polymers may be produced using the particularly cyclopropenyl-cyclopentadienyl Group 6 metal catalysts as described in U.S. Pat. Nos. 5,296,434 and 5,278,264, both of which are herein incorporated by reference.

Typically in a gas phase polymerization process a continuous cycle is employed where in one part of the cycle of a reactor system, a cycling gas stream, otherwise known as a recycle stream or fluidizing medium, is heated in the reactor by the heat of polymerization. This heat is removed from the recycle composition in another part of the cycle by a cooling system external to the reactor. Generally, in a gas fluidized bed process for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See for example U.S. Pat. Nos. 4,543,399, 4,588,790, 5,028,670, 5,317,036, 5,352,749, 5,405,922, 5,436,304, 5,453,471, 5,462,999, 5,616,661 and 5,668,228, all of which are fully incorporated herein by reference.).

The reactor pressure in a gas phase process may vary from about 100 psig (690 kPa) to about 500 psig (3448 kPa), preferably in the range of from about 200 psig (1379 kPa) to about 400 psig (2759 kPa), more preferably in the range of from about 250 psig (1724 kPa) to about 350 psig (2414 kPa).

The reactor temperature in a gas phase process may vary from about 30° C. to about 120° C., preferably from about 60° C. to about 115° C., more preferably in the range of from about 70° C. to 110° C., and most preferably in the range of from about 70° C. to about 95° C.

Other gas phase processes contemplated by the process of the invention include those described in U.S. Pat. Nos. 5,627,242, 5,665,818 and 5,677,375, and European publications EP-A-0 794 200, EP-A-0 802 202 and EP-B-634 421 all of which are herein fully incorporated by reference.

In a preferred embodiment, the reactor utilized in the present invention is capable and the process of the invention is producing greater than 500 lbs of polymer per hour (227 Kg/hr) to about 200,000 lbs/hr (90,900 Kg/hr) or higher of polymer, preferably greater than 1000 lbs/hr (455 Kg/hr), more preferably greater than 10,000 lbs/hr (4540 Kg/hr), even more preferably greater than 25,000 lbs/hr (11,300 Kg/hr), still more preferably greater than 35,000 lbs/hr (15,900 Kg/hr), still even more preferably greater than 50,000 lbs/hr (22,700 Kg/hr) and most preferably greater than 65,000 lbs/hr (29,000 Kg/hr) to greater than 100,000 lbs/hr (45,500 Kg/hr).

A slurry polymerization process generally uses pressures in the range of from about 1 to about 50 atmospheres and even greater and temperatures in the range of 0° C. to about 120° C. In a slurry polymerization, a suspension of solid, particulate polymer is formed in a liquid polymerization diluent medium to which ethylene and comonomers and often hydrogen along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed should be liquid under the conditions of polymerization and relatively inert. When a propane medium is used the process must be operated above the reaction diluent critical temperature and pressure. Preferably, a hexane or an isobutane medium is employed.

A preferred polymerization technique of the invention is referred to as a particle form polymerization, or a slurry process where the temperature is kept below the temperature at which the polymer goes into solution. Such technique is well known in the art, and described in for instance U.S. Pat. No. 3,248,179 which is fully incorporated herein by reference. Other slurry processes include those employing a loop reactor and those utilizing a plurality of stirred reactors in series, parallel, or combinations thereof. Non-limiting examples of slurry processes include continuous loop or stirred tank processes. Also other examples of slurry processes are described in. U.S. Pat. No. 4,613,484, which is herein fully incorporated by reference.

In an embodiment the reactor used in the slurry process of the invention is capable of and the process of the invention is producing greater than 2000 lbs of polymer per hour (907 Kg/hr), more preferably greater than 5000 lbs/hr (2268 Kg/hr), and most preferably greater than 10,000 lbs/hr (4540 Kg/hr). In another embodiment the slurry reactor used in the process of the invention is producing greater than 15,000 lbs of polymer per hour (6804 Kg/hr), preferably greater than 25,000 lbs/hr (11,340 Kg/hr) to about 100,000 lbs/hr (45,500 Kg/hr).

Examples of solution processes are described in U.S. Pat. Nos. 4,271,060, 5,001,205, 5,236,998 and 5,589,555, which are fully incorporated herein by reference.

A preferred process of the invention is where the process, preferably a slurry or gas phase process is operated in the presence of a cyclopropenyl-cyclopentadienyl Group 6 metal catalyst system of the invention and in the absence of or essentially free of any scavengers, such as triethylaluminum, trimethylaluminum, tri-isobutylaluminum and tri-n-hexylaluminum and diethyl aluminum chloride, dibutyl zinc and the like. This preferred process is described in PCT publication WO 96/08520 and U.S. Pat. Nos. 5,712,352 and 5,763,543, which are herein fully incorporated by reference. In another preferred embodiment of the process of the invention, the process is operated by introducing a benzil compound into the reactor and/or contacting a benzil compound with the cyclopropenyl-cyclopentadienyl Group 6 metal catalyst system of the invention prior to its introduction into the reactor.

EXAMPLES

Synthesis of Cyclopentadienyl Cyclopropenyl Molybdenum Dicarbonyl $Mo(CO)_6$ (2.6 g, 10 mmol) was refluxed in EtCN (60 ml)overnight. The reaction was cooled to ambient temperature and reacted with $C_3Ph_3Br$ (3.47 g, 10 mmol). After about 12 h an orange solid was filtered from the reaction mixture. All of the crude reaction product (1.65 g) was slurried in 30 ml THF and reacted with TlCp (0.71 g) for 12 h. the crude reaction was filtered and the filtrate reduced and subjected to column chromatography (120 to 240 mesh $SiO_2$). The product $(Cp)(C_3Ph_3)Mo(CO)_2$ was eluted with 50/50 $CH_2Cl_2$/pentane and isolated as an orange-yellow solid (0.9 g).

Synthesis of Cyclopentadienyl Cyclopropenyl Molybdenum Dichloride $(Cp)(C_3Ph_3)Mo(CO)_2$ (0.9 g) was slurried in $CH_2Cl_2$ and reacted with 2 equivalents of PCl5. After 1 hour a crystalline burgandy solid was filtered from the reaction mixture.

Ethylene Polymerization

A 1 L autoclave was filled with 400 ml hexane and 400 microliters of triisobutyl aluminum and heated to 60° C. It was filled to a pressure of 125 psig ethylene and the ethylene source remained open to supply a continuous supply of $C_2$ to the reaction. A preactivated catalyst made from reacting cyclopentadienyl cyclopropenyl molybdenum dichloride (Tm) with 30% methylalumoxane (MAO) in toluene was then added to the autoclave under $N_2$ pressure. The polymerization runs are recorded below.

TABLE 1

| Run | Tm Complex (mg) | MAO (ml) | Time (min) | Yield (g) | Mw | Mn |
|---|---|---|---|---|---|---|
| 1. | 25 | 5.0 | 60 | 1.6 | 250,000 | 3.8 |
| 2. | 25 | 5.0 | 30 | 1.5 | 534,000 | 4.6 |

Ethylene/Hexene Copolymerization

The above procedure was followed except that 30 ml hexene was added to the autoclave after the addition.

TABLE 2

| Tm Complex (mg) | MAO (ml) | Time (min) | Yield (g) | Mw | Mn | $C_6$ (wt %) |
|---|---|---|---|---|---|---|
| 15 | 5.0 | 60 | 1.6 | 343,000 | 2.4 | 61 |

Synthesis of $C_3Ph_3PdCl_2Br$ (COD)$PdCl_2$ (0.80 g, 2.8 mmol) and [$C_3Ph_3$][Br] (1.0 g, 2.8 mmol) were reacted together in about 40 ml $CH_2Cl_2$ at room temperature. After 3 hr. an orange solid (1.2 g) was filtered and washed with additional $CH_2Cl_2$.

Polymerizations with $C_3Ph_3PdCl_2Br$/MAO

Ethylene homopolymerizations were performed in a 500 ml stainless steel autoclave by adding 400 ml hexane, 200 microliters TIBAL and heating to 100° C. Ethylene was then added to a pressure of 150 psi. The supply of ethylene to the reactor remained open to allow for continuous flow. The catalyst was prepared by combining the specified amount of complex and 30% MAO (wt %, in toluene) and adding all to the reactor via catalyst tube under $N_2$ pressure. The polymerization was run for 30 minutes then ethylene supply discontinued and the reactor contents were exposed to air, then washed with acidified methanol, followed by water. The polymer was dried in vacuo at 70° C. for 12 hr.

TABLE 3

| Tm Complex (mg) | MAO (ml) | Yield (g) | Mw | Mw/Mn |
|---|---|---|---|---|
| 20.0 | 20 | 8.65 | 76,500 | 2.4 |

Hexene/ethylene homopolymerizations were performed as above except that 30 ml hexene was added after the hexane. The polymer was worked up as above.

TABLE 4

| Tm Complex (mg) | MAO (ml) | Yield (g) | Mw | Mw/Mn | $C_6$ (wt %) |
|---|---|---|---|---|---|
| 20.0 | 20 | 6.4 | 68,500 | 2.3 | 1.6 |

Methyl acrylate/ethylene copolymerizations were performed as above except that 10 ml methyl acrylate (MA) was added after the hexane and no TIBAL was used.

TABLE 5

| Tm Complex (mg) | MAO (ml) | Yield (g) | MA (wt %) |
|---|---|---|---|
| 20.0 | 20 | 0.9 | 62.7 |
| 20.0 | 20 | 0.6 | 57.3 |

While the present invention has been described and illustrated by reference to particular embodiment thereof, it will be appreciated by those of ordinary skill in the art that the invention lends itself to variations not necessarily illustrated herein. For these reasons, then, reference should be made solely to the appended claims for the purposes of determining the true scope of the present invention.

What is claimed is:

1. An olefin polymerization catalyst comprising a cationic complex that results from contact of a neutral transition metal compound to an activator composition wherein the neutral transition metal compound is represented by the following formula:

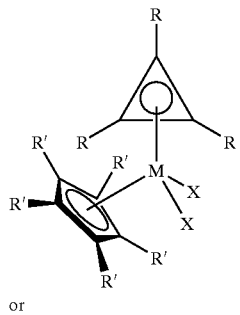

or

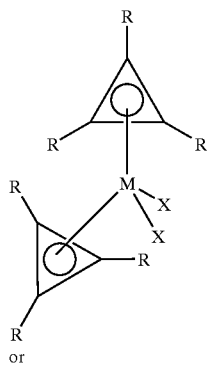

or

-continued

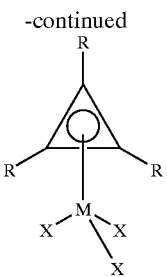

wherein each R and R' is independently hydrogen, hydrocarbyl, substituted-hydrocarbyl, halocarbyl, substituted-halocarbyl, hydrocarbyl-substituted organometalloid, halocarbyl-substituted organometalloid, disubstituted boron, disubstituted pnictogen, substituted chalcogen or halogen, and when R or R' is a bidentate radical it forms a $C_4$ to $C_{20}$ ring system with another R or R' to give a saturated or unsaturated polycyclic cyclopropenyl ligand or it forms a bridge between one cyclopropenyl ring and another cyclopropenyl ring or an X radical; each X radical is independently a halide, hydride, hydrocarbyl, substituted hydrocarbyl, halocarbyl, substituted halocarbyl, and hydrocarbyl- and halocarbyl-substituted organometalloid, substituted pnictogen, or substituted chalcogen, wherein at least one X is optionally a pi-bonded cyclopentadienyl or a cyclopentadienyl-derived ligand and one X is optionally an amido or an imido radical; and M is a Group 6 or 10 transition metal.

2. The olefin polymerization catalyst of claim 1 wherein M molybdenum.

3. The olefin polymerization catalyst of claim 1 wherein the neutral transition metal compound is cyclopropenyl cyclopentadienyl molybdenum dichloride.

4. The olefin polymerization catalyst of claim 1 wherein M is palladium.

5. The olefin polymerization catalyst of claim 1 wherein the neutral transition metal compound is cyclopropenyl palladium trichloride.

6. A method of polymerizing olefins, comprising contacting one or more polymerizable olefins under polymerization conditions with a polymerization catalyst comprising a cationic complex that results from exposure of a neutral transition metal compound to an activator composition wherein the neutral transition metal compound is represented by the following formula:

$(C_3R_3)_mMX_n$ wherein $(C_3R_3)$ is a cyclopropenyl ring and each R is independently hydrogen, hydrocarbyl, substituted-hydrocarbyl, halocarbyl, substituted-halocarbyl, hydrocarbyl-substituted organometalloid, halocarbyl-substituted organometalloid, disubstituted boron, disubstituted pnictogen, substituted chalcogen or halogen, and when R is a bidentate radical it optionally forms a $C_4$ to $C_{20}$ ring system to give a saturated or unsaturated polycyclic cyclopropenyl ligand or it may form a bridge between one $(C_3R_3)$ and another $(C_3R_3)$ or an X radical; each X radical is independently a halide, hydride, hydrocarbyl, substituted hydrocarbyl, halocarbyl, substituted halocarbyl, and hydrocarbyl- and halocarbyl-substituted organometalloid, substituted pnictogen, or substituted chalcogen, wherein at least one X is optionally a pi-bonded cyclopentadienyl or a cyclopentadienyl-derived ligand and one X is optionally an amido or an imido radical; M is a Group 6 or 10 transition metal, and m and n are integers of 1 or greater and m+n satisfies the valence of M.

7. The method of polymerizing olefins of claim 6, wherein the neutral transition metal compound is represented by the following formula:

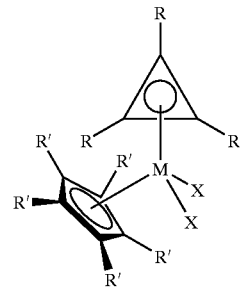

wherein R' has the same definition as R.

8. The method of polymerizing olefins of claim 6, wherein the neutral transition metal compound is represented by the following formula:

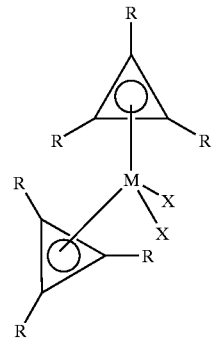

9. The method of polymerizing olefins of claim 6, wherein the neutral transition metal compound is represented by the following formula:

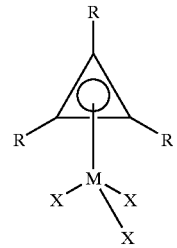

* * * * *